United States Patent
Obuchi et al.

(10) Patent No.: US 7,357,973 B2
(45) Date of Patent: *Apr. 15, 2008

(54) FLAT PLATE AND LIGHT GUIDE PLATE

(75) Inventors: Kazuyuki Obuchi, Kawasaki (JP); Teruhiko Suzuki, Kawasaki (JP); Kenji Otoi, Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 10/971,105

(22) Filed: Oct. 25, 2004

(65) Prior Publication Data

US 2005/0112329 A1  May 26, 2005

Related U.S. Application Data

(63) Continuation of application No. 10/252,592, filed on Sep. 24, 2002, now Pat. No. 6,828,007, which is a continuation of application No. 09/243,414, filed on Feb. 3, 1999, now Pat. No. 6,497,939.

(30) Foreign Application Priority Data

Feb. 3, 1998 (JP) .................................. 10-38061

(51) Int. Cl.
- C08F 4/642 (2006.01)
- C08F 232/06 (2006.01)
- G32B 3/00 (2006.01)

(52) U.S. Cl. ............ 428/156; 428/141; 428/220; 428/195.1; 385/129; 359/321; 526/280; 526/282; 526/284

(58) Field of Classification Search ........ 428/141, 428/156, 167, 195, 206, 207, 409; 385/129, 385/132; 359/237, 321, 558, 618; 526/280, 526/282, 283, 279, 281

See application file for complete search history.

(56) References Cited

U.S. PATENT DOCUMENTS

| | | | |
|---|---|---|---|
| 5,050,946 A | 9/1991 | Hathaway et al. | 385/33 |
| 5,237,641 A | 8/1993 | Jacobsen et al. | 385/146 |
| 5,303,322 A | 4/1994 | Winston et al. | 385/146 |
| 5,555,329 A | 9/1996 | Kuper et al. | 385/36 |
| 5,599,882 A * | 2/1997 | Nishi et al. | 525/332.1 |
| 5,637,400 A | 6/1997 | Brekner et al. | 428/137.3 |
| 5,838,403 A | 11/1998 | Jannson et al. | 349/65 |

OTHER PUBLICATIONS

Japanese Unexamined Patent Publication. No. H7-118344 dated May 9, 1995, Abstract Only.

Japanese Unexamined Patent Publication. No. H8-41178 dated Feb. 23, 1996, Abstract Only.

Japanese Unexamined Patent Publication. No. H9-268250 dated Oct. 14, 1997, Abstract Only.

* cited by examiner

*Primary Examiner*—Michael C. Miggins
(74) *Attorney, Agent, or Firm*—Kratz, Quintos & Hanson, LLP

(57) ABSTRACT

A flat plate made of a cycloolefin polymer comprising at least 30% by weight, based on the cycloolefin polymer, of repeating units (A) having an alicyclic structure. The repeating units (A) comprises at least 30% by weight, based on the repeating units (A), of repeating units (A-i) having no norbornane structure. The cycloolefin polymer has a weight average molecular weight of 5,000 to 50,000. The flat plate is especially useful as a light guide plate.

19 Claims, 3 Drawing Sheets

FLAT PLATE AND LIGHT GUIDE PLATE

CROSS REFERENCE TO RELATED APPLICATION

This application is a continuation of U.S. Ser. No. 10/252,592, filed Sep. 24, 2002, now U.S. Pat. No. 6,828,007 which is a continuation of U.S. Ser. No. 09/243,414, filed Feb. 3, 1999 now U.S. Pat. No. 6,497,939.

BACKGROUND OF THE INVENTION (1) Field of the Invention

This invention relates to a flat plate having excellent light transmittance, reduced moisture absorption and enhanced mechanical strength, and which is thin and becomes colored only to a negligible extent.

This flat plate is useful as a light guide plate and a light diffusion panel.

(2) Description of the Related Art

Characteristics such as a high light transmittance, a reduced thickness and a reduced distortion due to moisture absorption are required for light guide plates used as a liquid crystal base plate and a light diffuser panel. To provide a light guide plate having the required characteristics, for example, an injection-molded plate has been proposed in Japanese Unexamined Patent Publication No. H7-118344, which is made of a cycloolefin polymer having a norbornane ring structure, made by metathesis-catalyzed polymerization of 8-methyl-8-methoxycarbonyltetracyclododeca-3-ene, and having an intrinsic viscosity of 0.2 to 1.5 dl/g imparted thereto for enhancing the fluidity upon molding. However, this proposal has problems such that, (1) for enhancing the fluidity to provide a thin plate, when the molecular weight of the cycloolefin polymer is reduced, the mechanical strength of the plate is reduced, or the plate is cracked upon molding or becomes brittle, and, when the molding temperature is elevated, the molded plate becomes colored, and further that, in contrast, (2) when the molecular weight of the cycloolefin polymer is increased enough for improving the mechanical strength, the melt fluidity is decreased and a thin plate is difficult to obtain.

DISCLOSURE OF THE INVENTION

In view of the foregoing, a primary object of the present invention is to provide a flat plate such as a light guide plate, which has excellent light transmittance, reduced moisture absorption and enhanced mechanical strength, and which can be thin and becomes colored only to a negligible extent when molding is conducted at a high temperature.

In accordance with the present invention, there is provided a flat plate made of a cycloolefin polymer comprising at least 30% by weight, based on the cycloolefin polymer, of repeating units (A) having an alicyclic structure; said repeating units (A) comprising at least 30% by weight, based on the repeating units (A), of repeating units (A-i) having no norbornane structure; and said cycloolefin polymer having a weight average molecular weight of 5,000 to 50,000.

In accordance with the present invention, there is further provided a light guide plate made of the above-mentioned flat plate.

DESCRIPTION OF THE PREFERRED EMBODIMENT

Figure 1:
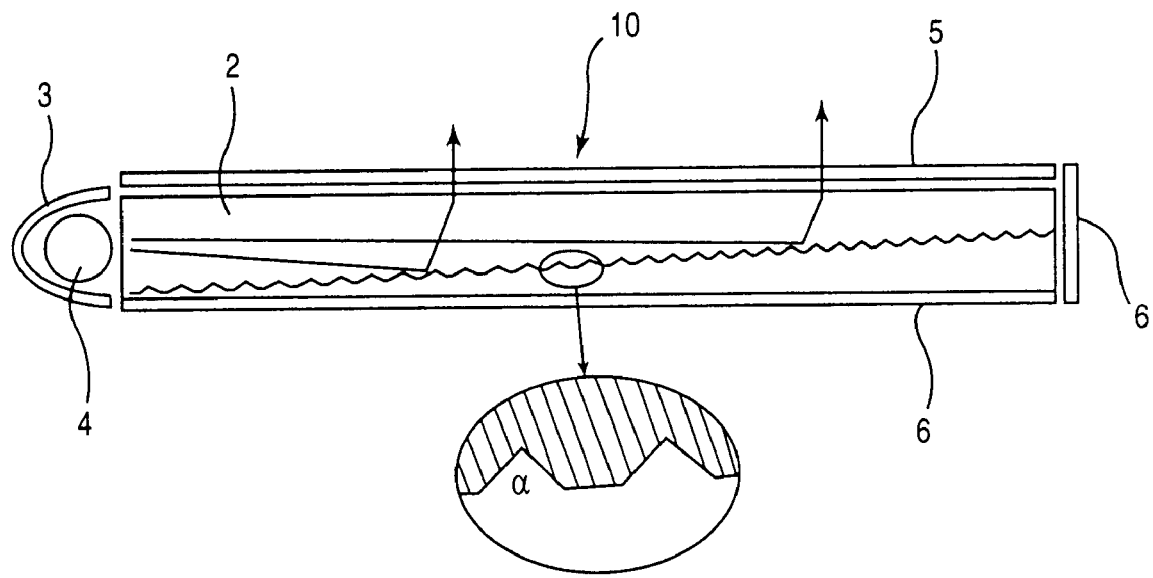
FIG. 1 is a cross-sectional view of a back light unit of a flat panel display of an information display apparatus, which display is provided with a light guide plate of the present invention.

The cycloolefin polymer constituting the flat plate of the present invention is characterized as comprising at least 30% by weight, based on the cycloolefin polymer, of repeating units (A) having an alicyclic structure; at least 30% by weight of said repeating units (A) being repeating units (A-i) having no norbornane The alicyclic structure in the repeating units (A) may be contained in any of the backbone chain and/or the side chains. In the case where especially high mechanical strength and transparency are required, the alicyclic structure is preferably contained in the backbone chain. The alicyclic structure may be either saturated or unsaturated, but a saturated alicyclic structure is preferable in view of high mechanical strength. As examples of the alicyclic structure, there can be mentioned cycloalkane and cycloalkene structures. Of these, a cycloalkane structure is preferable. The number of carbon atoms in the alicyclic structure can be suitably varied depending upon the intended use of the flat plate, but is usually in the range of 4 to 30, preferably 5 to 20 and more preferably 5 to 15 in view of enhanced mechanical strength.

The cycloolefin polymer may have either one kind of the repeating units (A) with an alicyclic structure or at least two kinds of the repeating units with an alicyclic structure in the molecule. The content of the repeating units (A) with an alicyclic structure in the cycloolefin polymer is suitably determined within the range of 30 to 100% by weight, preferably from 50 to 100% by weight, more preferably 70 to 100% by weight and most preferably 100% by weight, based on the cycloolefin polymer. If the content of the repeating units (A) with an alicyclic structure in the cycloolefin polymer is too small, the mechanical strength and light transmittance are poor.

The repeating units (A-i) with an alicyclic structure having no norbornane structure is not particularly limited, but includes, for example, those which are represented by the following formula (1):

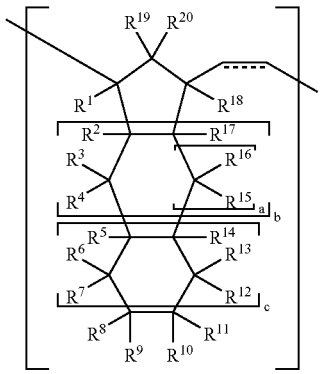

(1)

wherein $R^1$ through $R^{20}$ are independently selected from a hydrogen atom, hydrocarbon, hydroxyl, ester, alkoxy, cyano, imido and silyl groups, a halogen atom, and a hydrocarbon group having a functional group as substituent selected from a hydroxyl, ester, alkoxy, cyano, imido and sylyl groups; $R^8$ and $R^{10}$, or $R^9$ and $R^{11}$ may form together an unsaturated bond; or $R^8$ and $R^9$, or $R^{10}$ and $R^{11}$ may form together an alkylidene group; a is 0 or 1, b is 0 or 1 and c is 0, 1 or 2; and

----- represents a carbon-carbon single or double bond.

More specifically, in formula (1), $R^1$ through $R^{20}$ are independently selected from a hydrogen atom, hydrocarbon, hydroxyl, ester, alkoxy, cyano, imido and silyl groups, a halogen atom, and a hydrocarbon group having a functional group as substituent selected from a hydroxyl, ester, alkoxy, cyano, imido and silyl groups. $R^1$ through $R^{20}$ are preferably selected from a hydrogen atom and hydrogen bond, and more preferably a hydrogen atom. The carbon number in the hydrocarbon group is usually in the range of 1 to 20, preferably 1 to 10 and more preferably 1 to 6. The hydrocarbon group includes, for example, an alkyl group and an alkenyl group, preferably an alkyl group. Preferably the alkyl group has 1 to 6 carbon atoms. The hydrocarbon group having a substituent selected from the specified functional groups, includes, for example, an alkyl group having 1 to 20 carbon atoms, preferably 1 to 10 carbon atoms and more preferably 1 to 6 carbon atoms. The halogen atom includes, for example, fluorine, chlorine, bromine and iodine atoms.

In formula (1), $R^8$ and $R^{10}$, or $R^9$ and $R^{11}$ may form together an unsaturated bond; or $R^8$ and $R^9$, or $R^{10}$ and $R^{11}$ may form together an alkylidene group. The alkylidene group has usually 1 to 20 carbon atoms, preferably 1 to 10 carbon atoms and more preferably 1 to 6 carbon atoms.

In formula (1), a is 0 or 1, and preferably 0. b is 0 or 1, and preferably 1. c is 0, 1 or 2, preferably 1.

----- represents a carbon-carbon single or double bond. In view of the light transmittance, the proportion of the carbon-carbon single bond to the total of the carbon-carbon single and double bonds is at least 95%, preferably at least 98% and more preferably at least 99%.

Of the repeating units (A-i) with an alicyclic structure having no norbornane structure, represented by the formula (1), those which are represented by the following formula (2) are preferable, and that which is represented by the following formula (3) is more preferable.

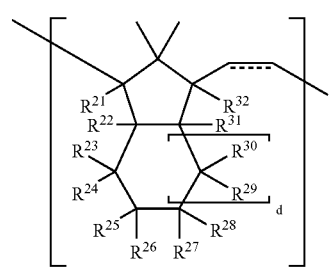

(2)

wherein definition and specific examples of $R^{21}$ through $R^{34}$ are the same as $R^1$ through $R^{20}$ in formula (1). In formula (2), $R^{25}$ and $R^{27}$, or $R^{26}$ and $R^{28}$ may form together an unsaturated bond; or $R^{25}$ and $R^{26}$, or $R^{27}$ and $R^{28}$ may form together an alkylidene group. The alkylidene group has usually 1 to 20 carbon atoms, preferably 1 to 10 carbon atoms and more preferably 1 to 6 carbon atoms. In formula (2), d is 0 or 1, and preferably 0.

----- represents a carbon-carbon single or double bond. In view of the light transmittance, the proportion of the carbon-carbon single bond to the total of the carbon-carbon single and double bonds is at least 95%, preferably at least 98% and more preferably at least 99%.

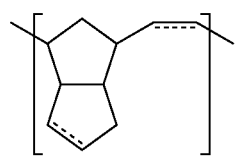

(3)

wherein

----- represents a carbon-carbon single or double bond. In view of the light transmittance, the proportion of the carbon-carbon single bond is at least 95%, preferably at least 98% and more preferably at least 99%.

As specific examples of the repeating units (A-i) having an alicyclic structure having no norbornane structure, there can be mentioned those which are derived from ethylnorbornene, dicyclopentadiene, dihydrododicyclopentadiene, dimethyldicyclopentadiene, methyldicyclopentadiene, 5-ethylidene-bicyclo[2.2.1]-hept-2-ene, 5-ethyl-bicyclo [2.2.1]-hept-2-ene, tetracyclo-[7.4.0.0$^{2,7}$.1$^{10,13}$]-tetradeca-11-ene and tetracyclo-[7.4.0.0$^{2,7}$.1$^{10,13}$]-trideca-2,4,6,11-tetraene.

The repeating units (A-i) having an alicyclic structure having no norbornane structure may be contained either alone or as a combination of at least two thereof. The content of the repeating units (A-i) having an alicyclic structure having no norbornane group in the entire repeating units (A) having an alicyclic structure is in the range of 30 to 100% by weight, preferably 50 to 100% by weight, more preferably 70 to 100% by weight and most preferably 80 to 100% by weight. If the content of the repeating units (A-i) having an alicyclic structure having no norbornane group in the entire repeating units (A) having an alicyclic structure is too small, the mechanical strength is poor, cracks are liable to occur at the molding step, and the shaped article is brittle, namely, a thin shaped article is difficult to obtain. In contrast, if the content of the repeating units (A-i) having an alicyclic structure having no norbornane group in the entire repeating units (A) having an alicyclic structure is large, a high mechanical strength can be obtained even though the molecular weight of the cycloolefin polymer is reduced to improve the flowability.

Among the repeating units (A) having an alicyclic structure, repeating units other than the repeating units (A-i) having no norbornane structure, namely, repeating units (A-ii) having a norbornane structure, are not particularly limited, and, for example, include those which are represented by the formula (4):

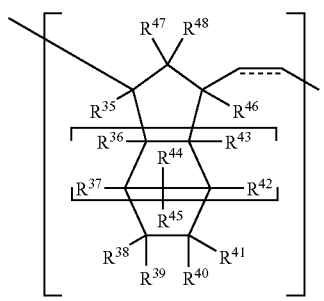

(4)

and specific examples of R$^{35}$ through R$^{48}$ are the same as R$^1$ in formula (1). R$^{38}$ and R$^{40}$, or R$^{39}$ and R$^{41}$ may form together an unsaturated bond; or R$^{38}$ and R$^{39}$, or R$^{40}$ and R$^{41}$ may form together an alkylidene group. The alkylidene group has usually 1 to 20 carbon atoms, preferably 1 to 10 carbon atoms and more preferably 1 to 6 carbon atoms. In formula (4), e is an integer of 1 to 3, and preferably 1.

represents a carbon-carbon single bond or double bond. In view of the light transmittance, the proportion of the carbon-carbon single bond to the total of the carbon-carbon single and double bonds is at least 95%, preferably at least 98% and more preferably at least 99%.

Among the repeating units (A-ii) having an alicyclic structure having a norbornane structure, those which are represented by the formula (5) are preferable, and those which are represented by the formula (6) are preferable

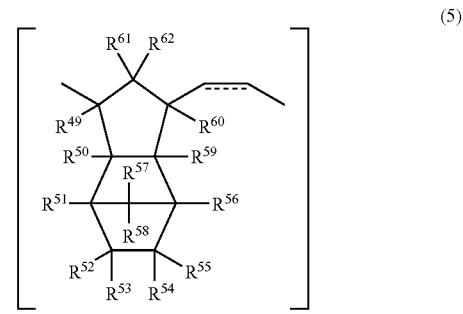

(5)

wherein definition and specific examples of R$^{49}$ through R$^{62}$ are the same as R$^1$ in formula (1). In formula (5), R$^{52}$ and R$^{54}$, or R$^{53}$ and R$^{55}$ may form together an unsaturated bond; or R$^{52}$ and R$^{53}$, or R$^{54}$ and R$^{59}$ may form together an alkylidene group. The alkylidene group has usually 1 to 20 carbon atoms, preferably 1 to 10 carbon atoms and more preferably 1 to 6 carbon atoms. In formula (5), represents a carbon-carbon single or double bond. In view of the light transmittance, the proportion of the carbon-carbon single bond to the total of the carbon-carbon single and double bonds is at least 95%, preferably at least 98% and more preferably at least 99%.

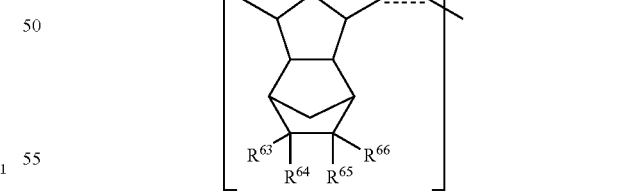

(6)

wherein definition and specific examples of R$^{63}$ through R$^{66}$ are the same as R$^1$ in formula (1). In formula (6), R$^{63}$ and R$^{65}$, or R$^{64}$ and R$^{66}$ may form together an unsaturated bond; or R$^{63}$ and R$^{64}$, or R$^{65}$ and R$^{66}$ may form together an alkylidene group. The alkylidene group has usually 1 to 20 carbon atoms, preferably 1 to 10 carbon atoms and more preferably 1 to 6 carbon atoms. In formula (6), represents a carbon-carbon single or double bond. In view of the light transmittance, the proportion of the carbon-carbon single bond to the total of the carbon-carbon single and double bonds is at least 95%, preferably at least 98% and more preferably at least 99%.

As specific examples of the repeating units (A-ii) having an alicyclic structure having a norbornane structure, there can be mentioned repeating units derived from 8-ethyl-tetracyclo-[4.4.9.1$^{2,5}$.1$^{7,10}$]-dodeca-3, 8-ethylidene-tetracyclo[4.4.0.1$^{2,5}$.1$^{7,10}$]-dodeca-3-ene, 8-methyl-tetracyclo[4.4.0.1$^{2,5}$.1$^{7,10}$]-dodeca-3-ene, and tetracyclo[4.4.0.1$^{2,5}$.1$^{7,10}$]-dodeca-3-ene.

The cycloolefin polymer may contain either one kind of the repeating units (A-ii) with an alicyclic structure having a norbornane structure or a combination of at least two kinds thereof. The content of the repeating units (A-ii) with an alicyclic structure having a norbornane structure is the remainder of the total repeating units (A) with an alicyclic structure, other than the repeating units (A-i) with an alicyclic structure having no norbornane structure, namely, 0 to 70% by weight, preferably 0 to 50% by weight, more preferably 0 to 30% by weight and most preferably 0 to 20% by weight, based on the total repeating units (A) with an alicyclic structure.

The remainder of the repeating units, other than the repeating units (A) with an alicyclic structure, in the cycloolefin polymer is repeating units (B) having no alicyclic structure. The repeating units (B) are not particularly limited, but usually include chain-like repeating units. The chain-like repeating units include, for example, those which are represented by the following formula (7).

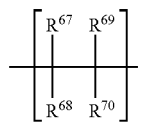

(7)

wherein R$^{67}$ through R$^{70}$ are the same as R$^1$ as defined in formula (1), and are preferably a hydrogen atom.

As specific examples of the chain-like repeating units, there can be mentioned repeating units derived from .alpha.-olefins such as ethylene, propylene, 1-butene and 1-pentene, aromatic vinyls such as styrene and .alpha.-methylstyrene, cycloolefins such as cyclobutene, cyclopentene and cyclohexene, and non-conjugated dienes such as 1,4-hexadiene.

The molecular weight of the cycloolefin polymer as measured by gel permeation chromatography (GPC) using cyclohexane as the solvent (or using toluene when the polymer is insoluble in cyclohexane) and expressed in terms of a weight average molecular weight of polyisoprene is usually in the range of 5,000 to 50,000 preferably 7,000 to 45,000 and more preferably 10,000 to 40,000. When the weight average molecular weight of the polymer is too small, the mechanical strength is poor. In contrast, when the weight average molecular weight of the polymer is too large, the melt fluidity is poor.

The cycloolefin polymer used in the present invention preferably has a temperature of at least 280° C., preferably at least 360° C. and more preferably at least 400° C., at which the loss of polymer weight upon heating reaches 5% by weight. In the case where the weight loss temperature upon heating is too low, when the injection molding is conducted at a high temperature in order to enhance the melt fluidity, the polymer is apt to be degraded. The resulting shaped plate has contained therein bubbles of gas produced by the degradation of polymer, which lead to occurrence of silver streaks. When the weight loss temperature upon heating is not higher than 280° C., the undesirable degradation of polymer does not occur even when the polymer is heated to a high temperature to enhance the melt fluidity, and thus, the production of bubbles and occurrence of silver streaks can be avoided.

The cycloolefin polymer used in the present invention has a melt viscosity of usually in the range of $1 \times 10^2$ to $1 \times 10^5$ poise and preferably $1 \times 10^2$ to $1 \times 10^3$ poise as measured at a temperature of 260° C. If the melt viscosity is too large, when the polymer is injection-molded for the production of a large-size plate, short-shots occur and a light guide plate having a light reflecting plane having a minute pattern with a high precision cannot be obtained. The resulting light guide plate has a poor function of emitting light uniformly over the entire major surface thereof. When the melt viscosity is in the above range, such disadvantage does not arise and thus a light guide plate with an enhanced processability is obtained.

The cycloolefin polymer used in the present invention may contain a fraction having a molecular weight of not larger than 1,000 as measured by the above-mentioned GPC. The content of the low-molecular-weight fraction is not particularly limited, but the content thereof is usually not larger than 20% by weight, preferably not larger than 10% by weight, more preferably not larger than 5% by weight and most preferably not larger than 3% by weight. When the content of the low-molecular-weight fraction is not larger than 20% by weight, the mechanical strength is enhanced and the balance between the mechanical strength and moldability is good. The lower limit of the content of the fraction with a molecular weight of not larger than 1,000 is not particularly limited, but preferably the content of the low-molecular-weight fraction is at least 0.2% by weight.

Production of Cycloolefin Polymer

The cycloolefin polymer used in the present invention can be produced by the conventional process. For example, a process can be adopted in which the olefin monomer having an alicyclic structure is polymerized in the presence of a metathesis catalyst system, and, if desired, the thus-obtained polymer is subjected to hydrogenation.

The olefin monomer (a) having an alicyclic structure preferably includes olefin monomers capable of forming repeating units having no norbornane structure. As examples of the such olefin monomers (a), there can be mentioned olefin monomers (a-i) represented by the following formula (8), preferably those which are represented by the following formula (9) and more preferably those which are represented by the following formula (10). It is described in, for example, Japanese Patent No. 2534086 and Japanese Examined Patent Publication No. H7-121981 that the olefin monomers (a-i) forms repeating units (A-i) when they are polymerized in the presence of a metathesis catalyst.

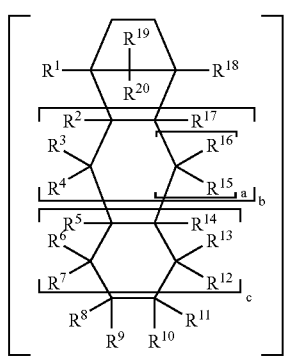
(8)

wherein $R^1$ to $R^{20}$, and a, b and c are the same as defined with regard to formula (1).

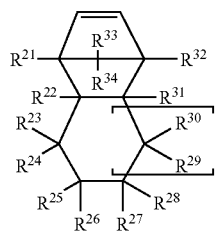
(9)

wherein $R^{21}$ to $R^{34}$, and d are the same as defined with regard to formula (2).

(10)

The olefin monomers (a-i) represented by the formulae (8), (9) and (10) may be used either alone or as a combination of at least two thereof. The proportion of these monomers (a-i) to the cycloolefin monomers (a) having an alicyclic structure is in the range of 30 to 100% by weight, preferably 50 to 100% by weight, more preferably 70 to 100% by weight, especially preferably 80 to 100% by weight and most preferably 100% by weight.

The remainder of the cycloolefin monomers (a) having an alicyclic structure, other than the olefin monomers (a-i) represented by the formulae (8), (9) and (10), includes alicyclic olefin monomers represented by the following formula (11), preferably alicyclic olefin monomers (a-ii) represented by the following formula (12) and more preferably alicyclic olefin monomers represented by the following formula (13).

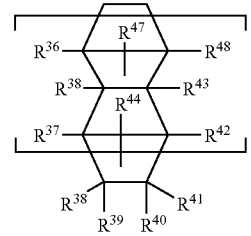
(11)

wherein $R^{38}$ to $R^{48}$, and e are the same as defined with regard to formula (4).

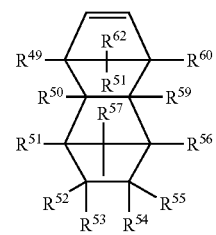
(12)

wherein $R^{49}$ to $R^{62}$ are the same as defined with regard to formula (5).

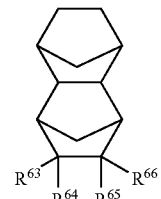
(13)

wherein $R^{63}$ to $R^{66}$ are the same as defined with regard to formula (6).

These cycloolefin monomers (a) having an alicyclic structure may be used either alone or as a combination of at least two thereof. The proportion of the cycloolefin monomers (a) to the total monomers is in the range of 30 to 100% by weight, preferably 50 to 100% by weight, more preferably 70 to 100% by weight and most preferably 100% by weight.

The remainder of the total monomers, other than the cycloolefin monomers (a) having an alicyclic structure, usually includes chain structure monomers. As examples of the chain structure monomers, there can be mentioned those which are represented by the following formula (14).

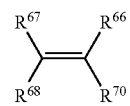
(14)

wherein $R^{67}$ to $R^{70}$ are the same as defined with regard to formula (7).

As specific examples of combinations of cycloolefin monomers used, the following combinations can be mentioned.

(1) DCP [monomer (a)]+ETD [monomer (b)],
(2) DCP [monomer (a)]+ENB [monomer (a)],
(3) DCP [monomer (a)]+TCD [monomer (b)]+ETD [monomer (b)],
(4) DCP [monomer (a)]+MTF [monomer (a)]+TCD [monomer (b)], and
(5) MTF [monomer (a)]+TCD [monomer (b)], wherein
DCP: Dicyclopentadiene
ETD: Ethyl-tetracyclo[4.4.0.1$^{2,5}$.1$^{7,10}$]-dodeca-3-ene
ENB: Ethylnorbornene (ethyl-bicyclo[2.2.1]-hept-2-ene
TCD: Tetracyclo[4.4.0.1$^{2,8}$.1$^{7,10}$]-dodeca-3-ene
MTF: Tetracyclo[7.4.0.0$^{2,7}$.1$^{10,13}$]-trideca-2,4,6,11-tetraene The metathesis catalyst used includes, for example, compounds of a metal of group VI of the periodic table such as tungsten (W) or molybdenum (Mo), and compounds of a metal of group IV of the periodic table such as titanium (Ti). Of these, tungsten (W) compounds and molybdenum (Mo) compounds are preferable. Tungsten (W) compounds are most preferable.

As specific examples of the tungsten (W) compounds, there can be mentioned $WBr_2$, $WBr_3$, $WBr_6$, $WCl_2$, $WCl_4$, $WCl_5$, $WCl_6$, $WF_2$, $WF_4$, $WF_5$, $WI_2$, $WI_4$, $WI_6$, $WOBr_4$, $WOCl_4$, $WOF_4$, $WO_2$, $H_2WO_4$, $NaWO_4$, $K_2WO_4$, $(NH_4)_2WO_4$, $CaWO_4$, $CuWO_4$, $MgWO_4$, $(CO)_5WC(OCH_3)(CH_3)$, $(CO_5)WC(OC_2H_5)(CH_3)$ and $(CO_5)WC(OC_2H_5)(C_4H_5)$. Of these, $WBr_2$, $WBr_3$, $WBr_6$, $WCl_2$, $WCl4$, $WCl5$, $WCl_6$, $WF_2$, $WF_4$, $WF_5$, $WI_2$, $WI_4$, $WI_6$, $WOBr_4$, $WOCl_4$ and $WOF_4$ are preferable. $WBr_2$, $WBr_3$, $WBr_4$, $WCl_2$, $WCl_4$, $WCl_5$, $WCl_6$, $WF_2$, $WF_4$, $WF_6$, $WI_2$, $WI_4$ and $WI_6$ are more preferable.

These metathesis catalysts can be used alone or as a combination of at least two thereof. The amount of the metathesis catalyst used is usually in the range of 0.1 to 1.5 parts by weight, 0.1 to 1.0 part by weight and more preferably 0.1 to 0.5 part by weight, based on 100 parts by weight of the total monomers.

In general a cocatalyst is used in combination with the metathesis catalyst for the metathesis polymerization, the cocatalyst include, for example, organoaluminum compounds and organotin compounds. Of these, organoaluminum compounds are preferable. As specific examples of the organoaluminum compounds, there can be mentioned trialkylaluminums such as trimethylaluminum, triethylaluminum, tripropylaluminum, tributylaluminum and triisobutylaluminum; and alkylaluminum halides such as diethylaluminum chloride and ethylaluminum dichloride. Of these, triethylaluminum, triisobutylaluminum and diethylaluminum chloride.

These cocatalysts may be used either alone or as a combination of at least two thereof. The amount of the cocatalyst used is usually in the range of 0.1 to 30 mole, preferably 0.1 to 20 mole and more preferably 0.1 to 10 mole, per mole of the metathesis catalyst. When a suitable amount of the cocatalyst is used, the formation of gel is minimized, the polymerization activity is enhanced and a high-molecular-weight polymer is easily obtained.

A combination of a tungsten (W) compound as the metathesis catalyst with an organoaluminum compound as the cocatalyst is preferable. But, in order to produce a cycloolefin polymer comprising repeating units (A-i) having no norbornane structure, having a high molecular weight (more specifically, a weight average molecular weight of 5,000 to 50,000, preferably 7,000 to 45,000 and more preferably 10,000 to 40,000), and containing a reduced amount of a low-molecular-weight fraction (more specifically, usually not larger than 20% by weight, preferably not larger than 10% by weight, more preferably not larger than 5% by weight and especially preferably not larger than 3% by weight, based on the weight of the cycloolefin polymer, of a fraction having a molecular weight of not larger than 1,000.), it is preferable to use a reaction adjuster in combination with the metathesis catalyst and the cocatalyst.

The reaction adjusters include at least one compound selected from polar compounds containing active hydrogen such as an alcohol and an amine, and polar compounds containing no active hydrogen such as an ether, an ester, a ketone and a nitrile. The active hydrogen-containing polar compounds have a function of preventing or minimizing the formation of gel and giving a high polymer with an enhanced molecular weight. Among such active hydrogen-containing polar compounds, an alcohol is preferable. The polar compounds containing no active hydrogen have a function of preventing or minimizing the formation of a low-molecular-weight fraction. Among such polar compounds having no active hydrogen, an ether, an ester and a ketone are preferable. A ketone is especially preferable.

As specific examples of the alcohol, there can be mentioned saturated alcohols such as methanol, ethanol, propanol, isopropanol, butanol, isobutanol, t-butanol, pentanol, isopentanol, hexanol and cyclohexanol; and unsaturated alcohols such as phenol and benzyl alcohol. Of these, propanol, isopropanol, butanol and isobutanol are preferable.

As specific examples of the ether, there can be mentioned dimethyl ether, diethyl ether, diisopropyl ether, dibutyl ether, ethylene glycol dibutyl ether and triethylene glycol dibutyl ether. Of these, diisopropyl ether and diethyl ether are preferable.

As specific examples of the ester, there can be mentioned methyl formate, ethyl formate, methyl acetate, ethyl acetate, propyl acetate, isopropyl acetate, methyl benzoate, ethyl benzoate, propyl benzoate and isopropyl benzoate. Of these, methyl acetate and ethyl acetate are preferable.

As specific examples of the ketone, there can be mentioned acetone, methyl ethyl ketone, diethyl ketone, methyl phenyl ketone and diphenyl ketone. Of these, acetone and methyl ethyl ketone are preferable.

As specific examples of the nitrile, there can be mentioned acetonitrile, benzonitrile and t-butyronitrile. Of these, benzonitrile and t-butyronitrile are preferable.

These reaction adjusters can be used either alone or in combination. A combination of a polar compound containing active hydrogen with a polar compound containing no active hydrogen is preferable. Combinations of an alcohol with a ketone; an alcohol with a nitrile; an alcohol with an ether; and an alcohol with an ester are especially preferable. The amount of the reaction adjusters is usually in the range of 0.01 to 20 mole, 0.1 to 10 mole and more preferably 1 to 5 mole, per mole of the metathesis catalyst.

The polymerization reaction is usually conducted in the presence of a solvent. The solvent used includes, for example, aromatic hydrocarbons such as benzene, toluene and xylene, aliphatic hydrocarbons such as n-pentane, hexane and heptane, alicyclic hydrocarbons such as cyclopentane, cyclohexane and cyclooctane. Of these, toluene, cyclohexane and cyclooctane are preferable. Toluene and cyclohexane are especially preferable. These solvents can be used either alone or as a combination of at least two thereof. The amount of the solvent is usually in the range of 10 to 1,000 parts by weight, preferably 50 to 700 parts by weight and more preferably 100 to 500 parts by weight, based on 100 parts by weight of the monomers.

The polymerization temperature is usually in the range of −10° C. to 200° C., preferably 0° C. to 100° C. and more preferably 10° C. to 80° C. The polymerization time is usually in the range of 30 minutes to 10 hours, preferably 1 hour to 7 hours and more preferably 2 hours to 5 hours. When the polymerization temperature is too high, the amount of a fraction having a molecular weight of not larger than 1,000 is increased. In contrast, when the polymerization temperature is too low, the rate of polymerization is too small and the conversion does not increase to a desired extent.

If desired, after the completion of polymerization, a hydrogenation catalyst can be added to the polymer to effect hydrogenation of the polymer. The hydrogenation catalyst used is not particularly limited provided that it is capable of being used generally for hydrogenation of olefin compounds. Usually homogeneous and heterogeneous catalysts can be used.

As specific examples of the heterogeneous catalyst, there can be mentioned nickel, palladium, platinum and solid catalysts comprised of such a metal supported on a carrier such as carbon, silica, diatomaceous earth, alumina or titainium oxide; for example, nickel/silica, nickel/diatomaceous earth, nickel/alumina, palladium/carbon, palladium/silica, palladium/diatomaceous earth and palladium/alumina.

The homogeneous catalyst includes, for example, a combination of a transition metal compound with an alkylaluminum compound or an alkyllithium compound. As specific examples thereof, there can be mentioned cobalt acetate/triethylaluminum, cobalt acetate/triisobutyl aluminum, nickel acetate/triethylaluminum, nickel acetate/tri-isobutylaluminum, nickel acetylacetonato/triethylaluminum, nickel acetylacetonato/tri-isobutylaluminum, titanocene chloride/n-butyllithium, and zirconocene chloride/n-butyllithium.

These hydrogenation catalysts can be used either alone or as a combination of at least two thereof. The amount of the hydrogenation catalyst is usually in the range of 0.01 to 100 parts by weight, preferably 0.1 to 50 parts by weight and more preferably 1 to 30 parts by weight, based on 100 parts by weight of the polymer.

The hydrogenation reaction is conducted usually under a hydrogen pressure of 1 to 150 kg/cm$^2$ at a temperature of 0 to 250° C., preferably 20 to 200° C. for 1 hour to 20 hours.

After the hydrogenation reaction, the polymer is filtered to remove the hydrogenation catalyst, and then coagulated and dried to give the cycloolefin polymer used in the present invention. In the case where a homogeneous catalyst system is used as the hydrogenation catalyst, after the completion of hydrogenation, an alcohol or water is added to deactivate the catalyst and render the polymer insoluble in the solvent, and then the polymer is filtered, coagulated and dried to give the cycloolefin polymer used in the present invention.

Other Polymer Components

If desired, other polymer components can be incorporated with the cycloolefin polymer used in the present invention. The polymer components include rubber polymers and resins.

As specific examples of the rubber polymers, there can be mentioned diene rubbers such as natural rubber, polybutadiene rubber, polyisoprene rubber, and acrylonitrile-butadiene copolymer rubber; styrene-butadiene copolymer rubber, styrene-isoprene copolymer rubber, and styrene-butadiene-isoprene terpolymer rubber; hydrogenation products of diene rubbers; ethylene-α-olefin copolymer rubbers such as ethylene-propylene copolymer rubber, saturated polyolefin rubbers such as copolymers of propylene with other α-olefins, α-olefin-diene-type copolymer rubbers such as ethylene-propylene-diene copolymer rubber, α-olefin-diene copolymer rubber, isobutylene-isoprene copolymer rubber, and isobutylene-diene copolymer rubber; special rubbers such as urethane rubber, silicone rubber, polyether rubber, acrylic rubber, propylene oxide rubber, and ethylene acrylic rubber; thermoplastic elastomers such as styrene-butadiene-styrene block copolymer rubber, and styrene-isoprene-styrene block copolymer rubber; hydrogenated thermoplastic elastomers; thermoplastic urethane elastomer; thermoplastic polyamide elastomer; and thermoplastic 1,2-polybutadiene elastomer.

As specific examples of the resins to be incorporated with the cycloolefin polymer, there can be mentioned polyolefins such as low-density polyethylene, high-density polyethylene, straight chain low-density polyethylene, ultra-low-density polyethylene, polypropylene, syndiotactic polypropylene, polybutene and polypentene; polyesters such as polyethylene terephthalate and polybutylene terephthalate; polyamides such as nylon 6 and nylon 66; ethylene-ethyl acrylate copolymer, ethylene-vinyl acetate copolymer, polystyrene, syndiotactic polystyrene, polyphenylene sulfide, polyphenylene ether, and polycarbonate.

These polymer components can be used either alone or as a combination of at least two thereof The amount of the polymer component is usually not larger than 100 parts by weight, preferably not larger than 70 parts by weight, more preferably not larger than 50 parts by weight and most preferably not larger than 30 parts by weight, based on 100 parts by weight of the cycloolefin polymer.

Additives

Additives can be incorporated in the cycloolefin polymer used in the present invention, according to the need. The additives used are not particularly limited provided that they are generally used in resin industries, and include, for example, antioxidants, light stabilizers, ultraviolet absorbers, lubricants, plasticizers, antistatic agents and light diffusing agents.

The antioxidants include, for example, phenolic antioxidants, phosphorus-containing antioxidants and sulfur-containing antioxidants. Of these, phenolic antioxidants are preferable. Alkyl-substituted phenolic antioxidants are especially preferable.

As the phenolic antioxidants, known phenolic antioxidants can be used and, as specific examples thereof, there can be mentioned acrylic compounds described in Japanese Unexamined Patent Publication (hereinafter abbreviated to "JP-A") S63-179953 and JP-A H1-168643, such as 2-t-butyl-6-(3-t-butyl-2-hydroxy-5-methylbenzyl)-4-methylphenyl acrylate, 2,4-di-t-amyl-6-(1-(3,5-di-t-amyl-2-hydroxyphenyl)ethyl)phenyl acrylate; alkyl-substituted phenolic compounds such as octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-ter-4-butyl-4'-hydroxyphenyl)propionate)methane[namely, pentaerythtyryl-tetrakis[3-(3,5-di-t-butyl-4-hydroxyphenyl)

propionate]], triethylene glycol bis(3-(3-t-butyl-4-hydroxy-5-methylphenyl)-propionate); and triazine group-containing phenolic compounds such as 6-(4-hydroxy-3,5-di-t-butylanilino)-2,4-bis-octylthio-1,3,5-triazine, and 6-(4-hydroxy-3,5-dimethylanilino)-2,4-bis-octylthio-1,3,5-triazine.

The phosphorus-containing antioxidants are not particularly limited provided that they are generally used in resin industries. As specific examples of the phosphorus-containing antioxidants, there can be mentioned monophosphite compounds such as triphenyl phosphite, diphenylisodecyl phosphite, phenylisodecyl phosphite, tris(nonylphenyl) phosphite, tris(dinonylphenyl) phosphite, tris(2,4-di-t-butylphenyl) phosphite, tris(2-t-butyl-4-methylphenyl) phosphite, tris(cyclohexylphenyl) phosphite, 2,2-methylene-bis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphnanthrene-10-oxide, and 10-decyloxy-9,10-dihydro-9-oxa-10-phosphaphenanthrene; and diphosphite compounds such as 4,4'-butylidene-bis(3-methyl-6-t-butylphenyl-di-tridecyl phosphite), 4,4'-isopropylidene-bis(phenyl-di-alkyl($C_{12}$-$C_{15}$) phosphite), 4,4'-isopropylidene-bis(diphenyl-mono-alkyl($C_{12}$-$C_{15}$) phosphite), 1,1,3-tris-(2-methyl-4-di-tridecyl phosphite-5-t-butylphenyl)butane, tetrakis(2,4-di-t-butylphenyl)-4,4'-biphenylene diphosphite, cyclic neopentanetetrayl bis(2,4-di-t-butylphenyl phosphite), cyclic neopentanetetrayl bis(2,4-dimethylphenyl phosphite), and cyclic neopentanetetrayl bis(2,6-di-t-butylphenyl phosphite). Of these, monophosphite compounds are preferable. Tris(nonylphenyl) phosphite, tris(dinonylphenyl) phosphite and tris(2,4-di-t-butylphenyl) phosphite are especially preferable.

As specific examples of the sulfur-containing antioxidants, there can be mentioned dilauryl 3,3-dithiopropionate, dimyristil 3,3-dithiopropionate, distearyl 3,3-dithiopropionate, laurylstearyl 3,3-dithiopropionate, pentaerylthritol-tetrakis-(.beta.-lauryl-thiopropionate), and 3,9-bis(2-dodecylthioethyl)-2,4,8,10-tetraoxaspiro[5,5]-undecane.

As preferable examples of the light stabilizer, there can be mentioned hindered amine light stabilizers such as 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-n-butyl malonate, and 4-(3-(3,5-di-t-butyl-4-hydroxyphenyl)propionyloxy)-1-(2-(3-(3,5-di-t-butyl-4-hydroxyphenyl)-propionylopxy)ethyl)-2,2,6,6-tetramethyl-piperdine.

As specific examples of the ultraviolet absorbers, there can be mentioned benzotriazole ultraviolet absorbers such as 2-(2-hydroxy-5-methylphenyl)-5H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole, and 2-(3,5-di-t-amyl-2-hydroxyphenyl)-2H-benzotriazole; benzoate ultraviolet absorbers such as 4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, 2-(2H-benzotriazol-2-yl)-4-methyl-6-(3,4,5,6-tetrahydrophthalymidyl-methyl)phenol, 2-(2-hydroxy-5-t-octylphenyl)-2H-benzotriazole and 2-(2-hydroxy-4-octylphenyl)-2H-benzotriazole; benzophenone ultraviolet absorbers such as 2,4-dihydroxy-benzophenone, 2-hydroxy-4-methoxybenzophenone, 2-hydroxy-4-methoxybenzophenone-5-sulfonic acid trihydrate, 2-hydroxy-4-octyloxybenzophenone, 4-dodecyloxy-2-hydroxybenzo-phenone, 4-benzyloxy-2-hydroxybenzophenone, 2,2',4,4'-tetrahydroxybenzophenone and 2,2'-dihydroxy-4,4'-dimethoxybenzophenone; acrylate ultraviolet absorbers such as ethyl-2-cyano-3,3-diphenyl acrylate and 2'-ethylhexyl-2-cyano-3,3-diphenyl acrylate; and nickel complex ultraviolet absorbers such as [2,2'-thiobis(4-t-octylphenolate)]-2-ethylhexylamine nickel.

As the lubricants, finely divided inorganic particles are generally used. As examples of the inorganic particles, there can be mentioned particles of oxide, hydroxide, sulfide, nitride, halide, carbonate, sulfate, acetate, phosphate, phosphite, organic carboxylate, silicate, titanate, borate of an element selected from those of group 1, group 2, group 4, group 6, group 7, groups 8 to 10, group 11, group 12, group 13 and group 14; and hydrate compounds thereof; composite compounds comprising these compounds as the main ingredient; and natural mineral.

As specific examples of the plasticizer, there can be mentioned phosphoric acid triester plasticizers such as tricresyl phosphate, trixylyl phosphate, triphenyl phosphate, triethylphenyl phosphate, diphenylcresyl phosphate, monophenyldicresyl phosphate, dicresylmonoxylenyl phosphate, arylalkyl phosphate, diphenylmonoxylenyl phosphate, monophenyldixylenyl phosphate, tributyl phosphate, triethyl phosphate, trichloroethyl phosphate, trioctyl phosphate and tris(isopropylphenyl) phosphate; phthalic acid ester plasticizers such as dimethyl phthalate, diethyl phthalate, dibutyl phthalate, diheptyl phthalate, di-n-octyl phthalate, di-2-ethylhexyl phthalate, di-isononyl phthalate, octyldecyl phthalate and butylbenzyl phthalate; aliphatic monobasic acid ester plasticizers such as butyl oleate and glycerine monooleic acid ester; aliphatic dibasic acid ester plasticizers such as dibutyl adipate; dihydric alcohol ester plasticizers; and oxy-acid ester plasticizers. Of these, phosphoric acid triester plasticizers are preferable. Tricresyl phosphate and trixylyl phosphate are especially preferable.

Hydrocarbon polymers which are liquid at normal temperature and predominantly have a C—C or C=C backbone structure can also be used as a softening agent or plasticizer. Among the liquid hydrocarbon polymers, straight chain or branched chain liquid hydrocarbon polymers having no hydrocarbon ring in the backbone are preferably used. In view of the weather resistance, hydrocarbon polymers having no C=C backbone structure are preferable. The liquid hydrocarbon polymers used have preferably a molecular weight of not larger than 10,000, more preferably 200 to 8,000 and especially preferably 300 to 4,000.

As specific examples of the liquid hydrocarbon polymers, there can be mentioned squalane ($C_{30}H_{62}$, MW:422.8), liquid paraffin (including while oil, ISO VG10, ISO VG15, ISO VG32, ISO VG68, ISO VG100, VG8 and VG12, stipulated in JIS K2231), polyisobtene, and hydrogenated polybutadiene. Of these, squalane, liquid paraffin and polyisobutene are preferable.

As specific examples of the antistatic agents, there can be mentioned alkylsulfonate salts such as sodium alkylsulfonate and phosphonium alkylsulfonate, and glycerol stearate.

The above-recited additives can be used either alone or as a combination of at least two thereof. The amount of the additive is suitably determined within a range in which the object of the invention can be achieved.

Flat Plate and Light Guide Plate

By the term "flat plate" used herein, we mean a shaped article having a flat shape wherein the ratio (L/T) of the minimum width L of the major surface to the maximum thickness T is at least 2. The minimum width L signifies length of the short side when the major surface is rectangular; diameter when the major surface is circle; and length of the minor axis when the major surface is oval. The maximum thickness T signifies the largest length as measured in the direction perpendicular to the major surface. The shape and size of the flat plate are not particularly limited and are suitably determined depending upon the particular use thereof. The shape can be any of square, rectangle, pentagonal or other polygonals, circle, ellipse, and other shapes. The size of the major surface can be varied in a broad range spanning from a minimum width of about 0.5 mm to a minimum width of about 100 cm or longer. The thickness T of the flat plate is suitably determined depending upon the particular use thereof, but is usually in the range of 0.5 to 10 mm, preferably 0.6 to 5.0 mm and more preferably 0.8 to 2.0 mm.

Usually a shaped article has a phase difference occurring due to the birefringence. The flat plate of the present invention usually has a phase difference not larger than 100 nm, preferably not larger than 70 nm and more preferably not larger than 50 nm. When the phase difference as measured in the direction of thickness is not larger than 100 nm, an optical element such as a light guide plate having enhanced and uniform luminance can be obtained. The phase difference in the direction of thickness is measured by the method hereinafter described.

A flat plate such as a light guide plate having such a reduced phase difference can be obtained, for example, by a method of annealing a shaped article to reduce the birefringence; a method of cutting to remove a part with a high birefringence of an injection-molded article, such as a part located in vicinity to the gate of a mold, whereby the remainder having a relatively low birefringence is selectively used; and a method of improving fluidity of the cycloolefin polymer to reduce the occurrence of birefringence upon molding.

The flat plate of the present invention preferably has a high surface precision, namely, the surface roughness as expressed as the maximum height Rmax is usually not larger than 5 µm, preferably not larger than 1 µm and more preferably 0.5 µm. When the flat plate having such a high surface precision is used as an optical element such as a light guide plate, uniformity and magnitude of luminance on the illuminating plane can be enhanced. The surface with such a reduced maximum height Rmax can be obtained, for example, by a method of polishing the surface of plate; a method of molding a cycloolefin polymer under selected conditions whereby defects such as burn mark can be avoided and the surface precision are enhanced; and a method of removing foreign matter from as-produced polymer in the polymer-producing step or from a molten polymer at the molding step, by using, for example, a filter.

The flat plate of the present invention can be thin and has high light transmittance, low moisture absorption, high mechanical strength and enhanced discoloration resistance. Therefore, the flat plate is suitable for optical use, for example, a light guide plate provided in a light illuminating apparatus of an information-giving device.

By the term "light guide pate" used herein we mean a plate-form optical element through which light from a light source transmits and is emitted uniformly from the major surface. For example, a light guide plate provided in a plane light illuminating apparatus of an information-giving device has a function of allowing light to transmit, which is incident on the incident side end of the plate from a fluorescent lamp, through the plate, and reflecting the light to a direction perpendicular to the major surface thereof and emitting the light uniformly from the major surface (i.e., light illuminating surface).

Referring to FIG. 1, in a surface illuminating apparatus 10, a light guide plate 2 constitutes the surface illuminating apparatus (back light unit) 10 in combination with a fluorescent lamp 4, reflector 3, a reflecting sheet 6 and a diffusion panel 5. If desired, a condenser prism (not shown) for conversing light is provided on the diffusion panel 5, and this assembly is combined with a liquid crystal, a color filter and other sheet-form elements to constitute a flat panel display unit forming a display of, for example, a portable computer, a car navigating system or a thin television picture tube. The light emitted from the fluorescent lamp 4 is reflected by the reflector 3 and is incident on an incident side end of the light guide plate 2. Then the light is passed through the plate 2 and reflected by an under major surface (reflecting surface) of the plate. The reflected light transmits in a direction perpendicular to a top major surface forming an illuminating surface and emits upward from the illuminating surface. Then the light transmits through the diffusion panel 5 to a display of an information-giving device.

Figure 2:
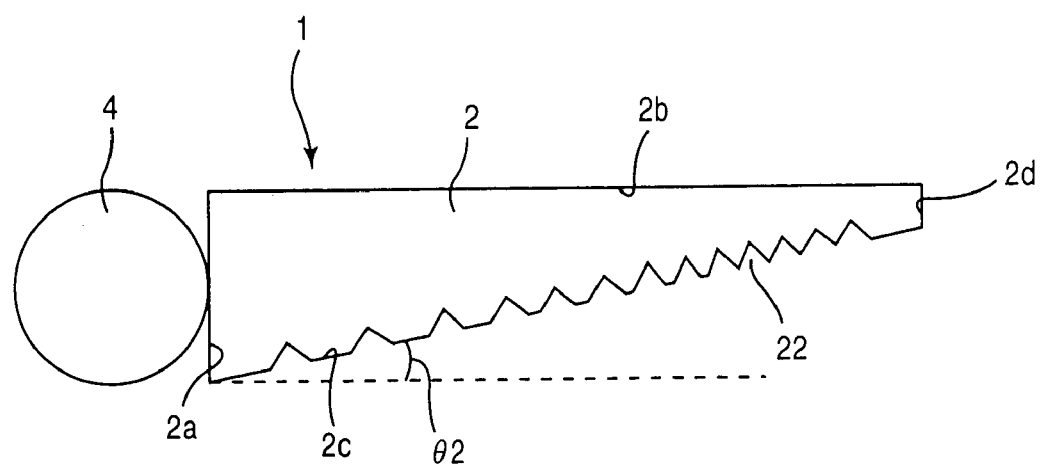
FIG. 2 is a cross-sectional view illustrating one example of a combination of a light guide plate with a light source constituting a back light unit.
Figure 3:
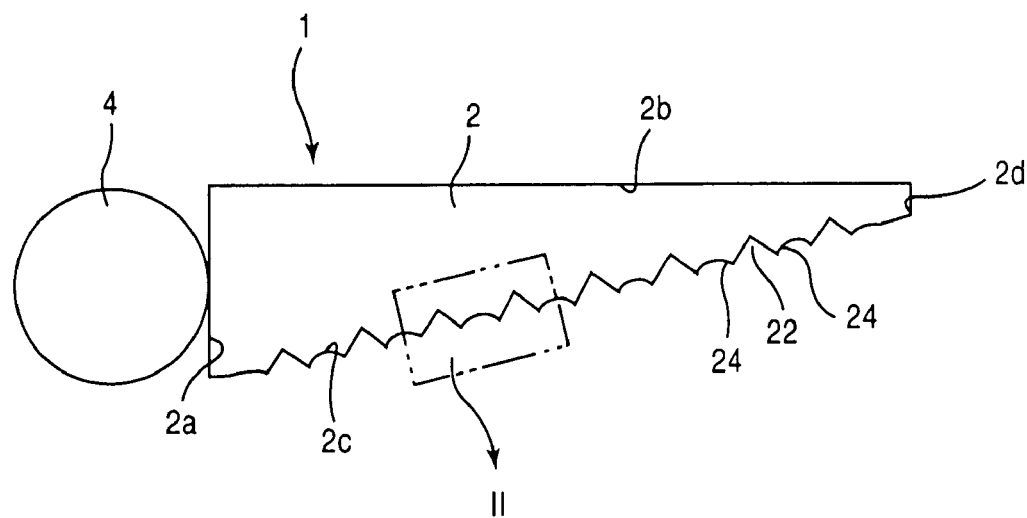
FIG. 3 is a cross-sectional view illustrating another example of a combination of a light guide plate with a light source constituting a back light unit.

The light guide plate 2 may be of a flat shape, but preferably has a wedge-shaped cross-section which has a thickness gradually decreasing from the light incident end to the opposite end. The light guide plate 2 has a printed pattern on the reflecting face of the bottom thereof or has a plurality of grooves with V-shaped cross-section on the reflecting face of the bottom thereof (as illustrated in FIGS. 1 to 3), in order to reflect the light to the top illuminating surface. The light guide plate of the present invention preferably has grooves with V-shaped cross-section on the reflecting face of the bottom thereof. The light guide plate having a printed pattern on the reflecting face has disadvantages such that the efficiency of light reflection is relatively low, and that two steps, i.e., a plate-shaping step and a printing step, are necessary for making the plate. In contrast, the light guide plate made of the cycloolefin polymer used in the present invention has minute grooves with high precision, because the cycloolefin polymer exhibits good capability of following minute grooves on the inner mold surface. Thus, the light guide plate with minute grooves on the reflecting face can be made by one step including plate-shaping and groove-forming. Further the plate exhibits a relatively high reflection efficiency.

A plurality of minute V-shaped grooves extending in parallel and perpendicular to the direction of light transmission are formed on the reflecting face of the light guide plate, as illustrated in FIG. 1 and a partial enlarged view. The V-shaped grooves have pitches gradually decreasing from the light incident side end to the opposite end (right-hand end in FIG. 1) so that the reflected light is emitted uniformly over the entire area of the top illuminating surface.

Referring to FIG. 2, a surface illuminating device 1, light is incident from a lamp 4 on the incident side end 2a and is allowed to transmit through a light guide plate 2. The light is reflected on the reflecting face 2c having formed thereon a plurality of grooves 22 with V-shaped cross-section. The light guide plate 2 has a thickness gradually decreasing from the light incident side end 2a to the opposite end 2d, and thus, a wedge-shaped cross-section. The grooves have pitches gradually decreasing from the light incident side end 2a to the opposite end 2d so that the light reflected by the reflecting face 2c emits uniformly over the illuminating surface 2b.

In the light guide plate illustrated in FIG. 1 and FIG. 2, the major surface usually has an area of 10 to 2,500 cm$^2$, preferably 100 to 2,500 cm², more preferably 200 to 2,500 cm², and especially preferably 500 to 2,500 cm². The thickness is usually in the range of 0.5 mm to 5 mm. Top angle of each V-shaped groove (shown as a in the partial enlarged view in FIG. 1) is usually 100 to 170° and preferably 120 to 150°. The depth of the V-shaped grooves is usually 0.1 to 100 μm and preferably 1 to 50 μm. The ratio of the minimum pitch of grooves formed at the right hand end to the maximum pitch of grooves formed at the light incident side end is usually 1/20 to ½ and preferably 1/10 to 1/3. The maximum pitch is usually 0.1 to 10 mm and preferably 0.2 to 5 mm. The slanting angle of the light reflecting face, shown as θ in FIG. 2, is 0.1 to 15°.

Figure 4:
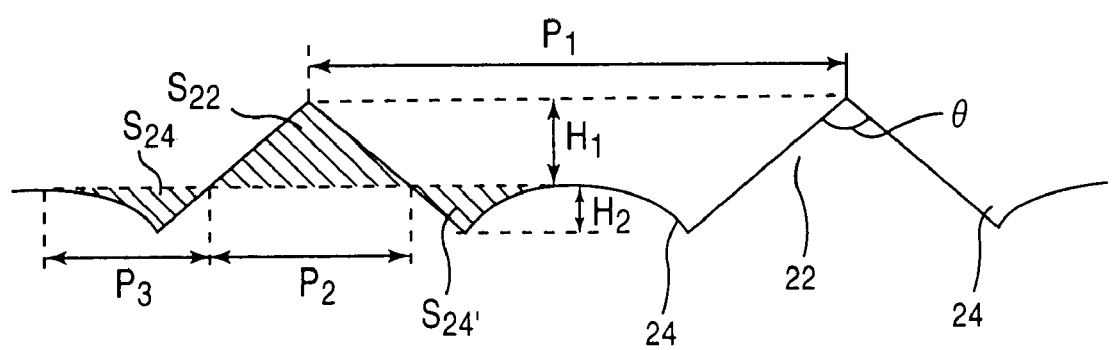
FIG. 4 is an enlarged view of part II in FIG. 3.

Referring to FIG. 3 and FIG. 4, a light guide plate 2 with wedge-shaped cross-section having a structure similar to those shown in FIG. 1 and FIG. 2 is illustrated. In this light guide plate, pitches P1 between adjacent grooves 22 in vicinity of the light incident side end 2a is usually 50 to 10,000 μm, preferably 100 to 5,000 μm and more preferably 500 to 2,000 μm, and pitches P1 between adjacent grooves in vicinity of the opposite end 2d is usually 10 to 1,000 μm, preferably 30 to 500 μm and more preferably 50 to 100 μm. The ratio of P1 in vicinity of the light incident side end 2a to P1 in vicinity of the opposite end 2d is preferably in the range of 10/1 to 3/1. The width P2 of groove 22 is usually 10 μm to 5 mm, preferably 30 μm to 2 mm and more preferably 50 μm to 1 mm. The depth H1 of groove 22 is usually 1 to 500 μm, preferably 10 to 100 μm and more preferably 30 to 80 μm. The angle θ of groove 22 is 70 to 150°, preferably 90 to 130° and more preferably 100 to 120°.

As illustrated in FIG. 4, ridges 24 are formed at both sides of each groove 22 having a height H2 of usually 10 to 150 μm, preferably 20 to 120 μm and more preferably 25 to 100 μm. The ratio of the height H2 of ridge 24 to the depth H1 of V-shaped groove 22 is in the range of 10 to 500%, preferably 20 to 300% and more preferably 30 to 200%. The width P3 of ridge 24 is usually 10 to 1,000 μm, preferably 50 to 600 μm and more preferably 100 to 400 μm. The ratio of the cross-sectional area S22 of each groove 22 to the cross-sectional area S24 of each ridge 24 is usually in the range of 10/1 to 10/100, preferably 10/2 to 10/50 and more preferably 10/5 to 10/20.

Figure 5:
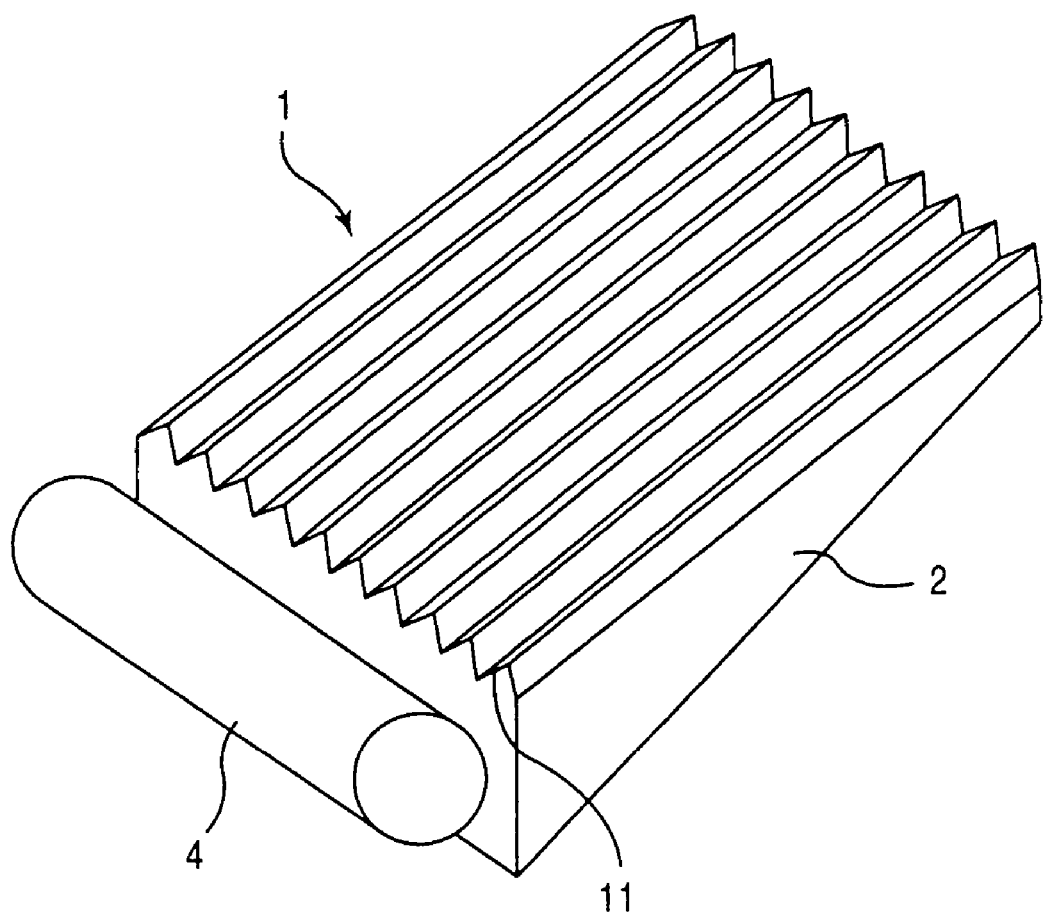
FIG. 5 is a perspective view illustrating a plane of a guide plate, through which a light comes out.

As illustrated in FIG. 5, minute grooves 11 can be formed on an illuminating surface of the light guide plate 1 of the present invention of a light emitting device 1. By forming the minute grooves 11 on the illuminating surface of plate, a condenser panel can be omitted. The minute grooves are formed simultaneously with the molding of the plate. Thus, assembly of a plane light emitting apparatus can be conducted in a simple manner with use of a reduced number of parts.

The flat plate including the light guide plate of the present invention can be made from a composition comprising the above-mentioned cycloolefin polymer and other ingredients. The shaping method is not particularly limited, and may be conventional. For example, injection molding, inflation shaping, compression molding, extrusion shaping, cast shaping, and continuous extrusion shaping can be conducted. Of these, an injection molding method is preferable because of good flowability of polymer and processability. The injection molding conditions are suitably chosen depending upon the particular shape, size and composition of plate. The molding polymer temperature is usually in the range of 100 to 400° C., preferably 150 to 350° C. and more preferably 200 to 300° C. in view of balanced flowability and discoloration resistance.

It is not preferably, however, that the light guide plate is made of a flat plate or sheet prepared by drawing, because the polymer is oriented in the direction of drawing, and thus, the phase difference occurring due to birefringence as measured in the thickness direction of the plate is undesirably large.

The procedure for making a light guide plate having a shape as illustrated in FIGS. 1 to 5 can also be applied to cycloolefin polymers other than the above-mentioned cycloolefin polymer.

The light guide plate of the present invention with V-shaped grooves and further ridges on the light reflecting face, made of the specific cycloolefin polymer, is beneficial in that the melt-flowability of polymer is high, and thus, grooves and ridges with high precision can be formed simultaneously with molding of plate. The cycloolefin polymer has a high mechanical strength, and thus, when the molded plate is released from a mold at the step of molding, cracks and cutouts do not occur and the plate is not distorted. The light guide plate exhibits enhanced and uniform luminance at the illuminating surface thereof.

The invention will now be specifically described by the following examples. Parts and % in the examples are by weight unless otherwise specified. Properties of polymer and polymer plate were evaluated by the following methods.

(1) Weight Average Molecular Weight

The weight average molecular weight was determined by gel permeation chromatography (GPC) using cycohexane (or toluene when the polymer is not soluble in cyclohexane) as a solvent, and was expressed as weight average molecular weight of polyisoprene.

(2) Low-Molecular-Weight Fraction

The content of a fraction having a weight average molecular weight of not larger than 1,000 was calculated from the results of determination of the weight average molecular weight described in the preceding paragraph (1).

(3) Hydrogenation Percentage

The hydrogenation percentage was determined by $^1$H-NMR.

(4) Glass Transition Temperature

The glass transition temperature was determined by DSC method.

(5) Mechanical Strength (A) Crack Occurrence at Molding Step

Formation of cracks and cutouts in a molded plate were observed when the plate was released from a mold.

The test was conducted on ten plate specimens and the test results were evaluated according to the following four ratings.

a: Cracks or cutouts did not occur at all.
  b: Cracks or cutouts occurred in one to three plates among the ten plates.
  c: Cracks or cutouts occurred in four to six plates among the ten plates.
  d: Cracks or cutouts occurred in seven or more plates among ten plates.

The above-test was repeated many times and the percentage of crack or cutout formation was determined.

(B) Crack Occurrence at Drop-Weight Test

A missile-shaped weight (50 g) having a diameter of ¾ inch was gravity-dropped from a height of 1 m onto a plate specimen. The drop-weight test was conducted on ten plate specimens and the test results were evaluated according to the following four ratings.

a: Cracks or fracture did not occur at all.
b: Cracks or fractures occurred in one to three plates among the ten plates.
c: Cracks or fractures occurred in four to six plates among the ten plates.
d: Cracks or fractures occurred in all of the ten plates.

The above-test was repeated many times and the percentage of crack or fracture occurrence was determined.

(6) Distortion Due to Moisture Absorption

A flat plate specimen was allowed to stand for one week at a temperature of 23° C. and a relative humidity of 60% in a thermostatic chamber, and warpage due to moisture absorption was observed. The results were expressed according to the following ratings.
a: Warpage did not occur at all.
b. Warpage occurred.

(7) ΔYI Value

ΔYI value was measured by a color difference meter (SM color computer; made by Suga Tester K.K.). The test results were expressed according to the following four ratings.
a: ΔYI value was below 0.5.
b: ΔYI value was at least 0.5 but below 0.8.
c: ΔYI value was at least 0.8 but below 1.1.
d: ΔYI value was at least 1.1.

(8) Occurrence of Emission Points and Dark Points

Occurrence of emission points and dark points on an illuminating surface of a light guide plate was visually observed by the naked eye.

(9) Surface Roughness Rmax

Surface roughness Rmax was expressed by maximum height (unit: μm) as measured by using a stylus surface roughness tester with a resolving power of 0.02 μm.

(10) Phase Difference in Thickness Direction

Birefringence of a light guide plate was measured by a birefringence measuring apparatus (made by Oak Co., ADR-100XY). The measurement was conducted at voluntarily chosen three points, on the major surface, which are 1 cm apart from the incident side end, and an average value (unit: μm) was calculated.

Preparation of Polymer

REFERENCE EXAMPLE 1

A flask having a volume of 1 liter was flashed with nitrogen and was charged with 5 g of dicyclopentadiene monomer and 120 g of cyclohexane. 0.57 m-mol of tri-isobutylaluminum ($iBu_3Al$) as polymerization catalyst, 0.57 m-mol of isobutyl alcohol and 0.189 m-mol of acetone as reaction adjuster, and 4.55 m-mol of 1-hexene as molecular weight modifier were added. To the content, 0.076 m-mol of tungsten hexachloride was added and the mixture was maintained at 60° C. for 5 minutes with stirring. Then 45 g of dicyclopentadiene monomer and a mixture of 0.114 m-mol of tungsten hexachloride with cyclohexane were continuously dropwise added to the reaction mixture while the reaction mixture was maintained at 60° C. After completion of the dropwise addition, the reaction mixture was further stirred for 30 minutes to complete a ring-opening polymerization.

The thus-obtained polymer had a weight average molecular weight (Mw) of 16,000. Analysis of the polymer solution by gas chromatography revealed that peak of unreacted monomer was not detected, and thus, the conversion was 100%. The content of repeating units having an alicyclic structure with two rings having no norbornane structure was 100% by weight.

The polymer solution was placed in an autoclave having a volume of 1 liter, and 160 g of cyclohexane was added thereto. Then 2.5 g of a nickel catalyst supported on a diatomaceous earth as hydrogenation catalyst and 2.5 g of activated alumina having a surface area of 320 $cm^2$/g, a pore volume of 0.8 $cm^3$/g and an average particle diameter of 15 μm (Neobead D powder, supplied by Mizusawa Kagaku K.K.) were added. The autoclave was flashed with hydrogen and the inner pressure was elevated at about 10 kg/$cm^2$ and the temperature was elevated to 160° C. while being stirred. When the temperature was stabilized, the hydrogen pressure was maintained at 40 kg/$cm^2$ and a reaction was conducted for 8 hours while hydrogen consumed during the reaction was supplemented.

After completion of the hydrogenation reaction, the hydrogenation catalyst and the activated alumina were removed by filtration, and 0.1 part by weight, based on 100 parts by weight of the hydrogenated polymer, of pentaerythrityl-tetrakis[3-(3,5-di-t-butyl-4-hydroxyphenyl)propionate] as antioxidant was added. The mixture was dried at 380° C. under a reduced pressure to remove the solvent. Then the molten polymer was pelletized in a nitrogen atmosphere by using an extruder to give a pelletized polymer [polymer (A)]. Polymer (A) had a weight average molecular weight (Mw) of 33,000, and contained 0.5% by weight of a fraction with a molecular weight of not larger than 1,000. The hydrogenation percentage of polymer (A) was 99.9%. The glass transition temperature was 97° C.

REFERENCE EXAMPLE 2

A polymer (b) was prepared by ring-opening polymerization and hydrogenated by the same procedures as mentioned in Reference Example 1 except that acetone as reaction adjuster was not used and the reaction temperature was changed to 70° C. Polymer (B) had a weight average molecular weight (Mw) of 32,400, and contained 10.0% by weight of a fraction with a molecular weight of not larger than 1,000. The hydrogenation percentage of polymer (B) was 99.9%. The glass transition temperature was 97° C. The content of repeating units having an alicyclic structure with two rings having no norbornane structure was 100% by weight.

REFERENCE EXAMPLE 3

A polymer (C) was prepared by ring-opening polymerization and hydrogenated by the same procedures as mentioned in Reference Example 1 except that a monomer mixture composed of dicyclopentadiene and 6-methyl-1,4:5,8-dimethano-1,4,4a,5,6,7,8,8a-octahydronaphthalene (70:30) was used. Polymer (C) had a weight average molecular weight (Mw) of 36,000, and contained 0.5% by weight of a fraction with a molecular weight of not larger than 1,000. The hydrogenation percentage of polymer (B) was 99.9%. The glass transition temperature was 110° C. The content of repeating units having an alicyclic structure with two rings having no norbornane structure was 70% by weight.

REFERENCE EXAMPLE 4

A reactor was thoroughly dried and flashed with nitrogen, and was charged with 25 parts of tetracyclododecene (TCD), 25 parts of dicyclopentadiene (DCP), 1% by mole, based on the total monomers, of 1-hexene, and 300 parts of toluene. Then 16 parts of a solution with a 1 mole concentration of triethylaluminum in toluene, 4 parts of triethylamine, and 3 parts of a solution with a 1 mole concentration of titanium tetrachloride in toluene were added to effect polymerization at 25° C. for 2 hours.

The reaction mixture was put into a mixture of acetone/isopropyl alcohol (1:1) to coagulate a polymer, and the precipitate was filtered and dried to give 74 parts of a polymer. The yield was 74%. Analysis of the polymer by proton NMR spectrum revealed that the polymer contained the TCD ingredient and the DCP ingredient at a weight ratio of 25:75. Then 50 parts of the polymer was dissolved in 500 parts of cyclohexane, and was subjected to hydrogenation reaction at a temperature of 140° C. for 4 hours under a hydrogen pressure of 60 kg/cm$^2$ by using 5 parts of a palladium/carbon catalyst. The obtained polymer solution was filtered to remove the catalyst, and then, put into a mixed solvent of acetone/isopropyl alcohol (1:1) to coagulate the polymer. The thus-obtained precipitate was filtered and dried to give 43 parts of a polymer (D).

Polymer (D) had a weight average molecular weight (Mw) of 68,000, and contained 0.6% by weight of a fraction with a molecular weight of not larger than 1,000. The hydrogenation percentage of polymer (D) was 99.9%. The glass transition temperature was 127° C. The content of repeating units having an alicyclic structure with two rings having no norbornane structure was 75% by weight.

REFERENCE EXAMPLE 5

An autoclave having an inner volume of 1 liter was charged with 100 g of 8-methyl-8-methoxycarbonyl-tetracyclo-[4.4.0.1$^{2,5}$.1$^{7,8}$]dodeca-3-ene, 60 g of 1,2-dimethoxyethane, 240 g of cyclohexane, 9 g of 1-hexene and 3.4 ml of a solution with a concentration of 0.96 mole/l of diethylaluminum chloride in toluene.

A flask was charged with 20 ml of a solution with a concentration of 0.05 mole/l of tungsten hexachloride in 1,2-dimethoxymethane and 10 ml with a concentration of 0.1 mole/l of para-aldehyde in 1,2-dimethoxyethane. Then 4.9 ml of the thus-obtained mixed solution was incorporated into the above-mentioned content of the autoclave. The autoclave was closed and the mixture was heated at 80° C. for 2.5 hours with stirring.

To the thus-obtained polymer solution, a mixed solvent of 1,2-dimethoxyethane/cyclohexane (2/8) was added to prepare a polymer solution (polymer/solvent ratio=1/9 by weight), and further 20 g of triethanolamine was added and stirred for 10 minutes. Then 500 g of methanol was added to the polymer solution, and the mixture was stirred for 30 minutes and allowed to stand to be thereby separated into two layers. The upper layer was removed, and methanol was again added to the lower layer. The mixture was stirred and allowed to stand to be thereby separated into two layers, followed by removal of the upper layer. This operation was repeated further two times, and the obtained lower layer was diluted with cyclohexane and 1,2-dimethoxyethane to give a polymer solution with a concentration of 10% in cyclohexane-1,2-dimethoxyethane. 20 g of palladium/silica-magnesia [supplied by Nikki Kagaku K.K., palladium content: 5%] was added to the polymer solution and hydrogenation was conducted under a hydrogen pressure of 40 kg/cm$^2$ at 165° C. for 4 hours. The hydrogenation catalyst was removed by filtration to give a solution of a hydrogenated polymer.

To 100 parts of the solution of the hydrogenated polymer, 0.1 part of pentaerythrityl-tetrakis[3-(3,5-di-t-butyl-4-hydroxyphenyl)propionate] as antioxidant was added, and the polymer solution was dried at 380° C. under a reduced pressure to remove the solvent. Then the molten polymer was pelletized by using an extruder in a nitrogen atmosphere. The thus-obtained polymer (E) had an intrinsic viscosity of 0.48 dl/g (30° C., in chloroform). The hydrogenation percentage was 99.5%. The glass transition temperature was 168° C. The content of repeating units having an alicyclic structure with two rings having no norbornane structure was 0% by weight.

EXAMPLES 1 TO 3

Making of Flat Plate

To 100 parts of each of polymers (A), (B) and (C) prepared in Reference Examples 1 to 3, 0.1 part of pentaerythrityl-tetrakis[3-(3,5-di-t-butyl-4-hydroxyphenyl)propionate] as antioxidant was added, and the mixture was kneaded together at 250° C. and pelletized by using an extruder. The pellet was injection-molded at a polymer temperature of 280° C. by using a commercially available injection molding machine to give a flat plate having a size of 15 cm×15 cm×1 mm. The flat plates exhibited a high light transmittance. Mechanical strength, ΔYI and distortion due to moisture absorption were evaluated. The results are shown in Table 1.

Making of Light Guide Plate

The above-mentioned pellet was extrusion-shaped into a light guide plate with a wedge-shaped cross-section shown in FIG. 1 and having the following sizes.

Diagonal length: 11 inch
Thickness at incident side end: 3 mm
Thickness at opposite side end: 0.8 mm
Depth of V-shaped groove: 5 μm
Top angle α of V-shaped groove: 140°.
Largest pitch at incident side end of grooves: 1 mm
Smallest pitch at opposite side end of grooves: 0.2 mm Using the light guide plate, a back light unit as illustrated in FIG. 1 was assembled. Light was rendered incident at a lamp current of 5 mA on the incident side end, and luminance on the illuminating surface was measured. The measurement of luminance was conducted on nine points uniformly distributed on the effective emitting region surrounded by the peripheral edge area with a width of 10 mm on the illuminating surface. The light guide plates made from polymers (A), (B) and (C) exhibited an average luminance of larger than 1,500 cd/m$^2$ and a fluctuation in luminance of below 20%.

COMPARATIVE EXAMPLE 1

A flat plate was injection-molded from polymer (D) prepared in Reference Example 4, by the same procedure as employed in Example 1 wherein the polymer temperature was changed to 350° C. with all other conditions remaining the same. Mechanical strength, ΔYI and distortion due to moisture absorption were evaluated. The results are shown in Table 1.

COMPARATIVE EXAMPLE 2

A flat plate was injection-molded from polymer (E) prepared in Reference Example 5, by the same procedure as employed in Example 1 wherein the polymer temperature was changed to 320° C. with all other conditions remaining the same. Mechanical strength, ΔYI and distortion due to moisture absorption were evaluated. The results are shown in Table 1.

TABLE 1

| No. | Polymer materials | Crack occurrence at weight drop (%) | Crack occurrence at molding (%) | ΔYI | Distortion** | Rmax (μm) | Phase difference (nm) | Emission point and dark point |
|---|---|---|---|---|---|---|---|---|
| Ex. 1 | A | a | 0 | a | a | 0.1 | 23 | none |
| Ex. 2 | B | a | 0 | a | a | 0.3 | 28 | none |
| Ex. 3 | C | b | 15 | a | a | 1.1 | 19 | *1 |
| Com. 1 | D | b | 26 | d | a | 1.5 | 60 | *2 |
| Com. 2 | E | d | 100 | d | b | 2.5 | 75 | *3 |

**: Distortion due to moisture absorption.
*1: Several emission points occurred.
*2: A dozen of or more emission points occurred.
*3: Several tens of emission points and dark points occurred.

As seen from Table 1, the flat plates of the invention have high mechnical strength, resistance to discoloration and resistance to distortion due to moisture absorption (Example 1 to 3). In the case where the cycloolefin polymer used has a salient proportion of repeating units having no norbornane structure, the flat plate exhibits excellent mechanical strength (at a weight-dropping test) (Examples 1, 2>Example 3>Comparative Example 1). In the case where the cycloolefin polymer used contains only very minor amount of a low-molecular-weight fraction, the mechanical strength is more enhanced (comparison of Example 1 with Example 2). When the cycloolefin polymer has repeating units consisting of a norbornane structure, the mechanical strength, resistance to discoloration and distortion due to moisture absorption are relatively poor (Comparative Example 2). When the molecular weight of the cycloolefin polymer is too large, the resistance to discoloration is poor (Comparative Example 1).

What is claimed is:

1. A flat plate made of a cycloolefin polymer comprising at least 30% by weight, based on the cycloolefin polymer, of repeating units (A) having an alicyclic structure; said repeating units (A) comprising at least 30% by weight, based on the repeating units (A), of repeating units (A-i) having no norbornane structure and more than 0% but not more than 70% by weight of repeating units (A-ii) having a norbornane structure, represented by the following formula (4):

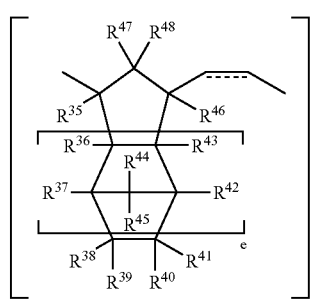

(4)

wherein $R^{35}$ through $R^{48}$ are independently selected from the group consisting of a hydrogen atom, hydrocarbon, hydroxyl, ester, alkoxy, cyano, imido and silyl groups, a halogen atom, and hydrocarbon groups having a functional group as substituent selected from the group consisting of hydroxyl, ester, alkoxy, cyano, imido and silyl groups; e is an integer of 1 to 3; and the chemical symbol of

----- in formula (4) represents a carbon-carbon single or double bond; and said cycloolefin polymer having a weight average molecular weight of 5,000 to 50,000, wherein the phase difference of the flat plate, as measured in the direction of the thickness of the plate, is not larger than 100 nm.

2. The flat plate according to claim 1, wherein the major surfaces of the flat plate have a surface roughness of not larger than 5 μm as expressed in terms of the maximum height (Rmax).

3. The flat plate according to claim 1, wherein the repeating units (A-i) having no norbornane structure are represented by the formula (2):

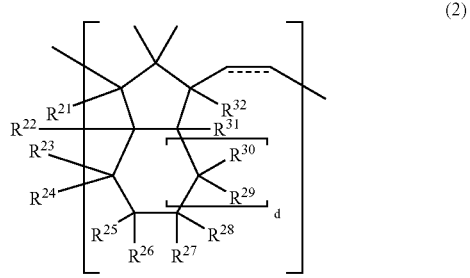

(2)

wherein $R^{21}$ through $R^{34}$ are independently selected from the group consisting of a hydrogen atom, hydrocarbon, hydroxyl, ester, alkoxy, cyano, imido and silyl groups, a halogen atom, and a hydrocarbon group having a functional group as substituent selected from the group consisting of a hydroxyl, ester, alkoxy, cyano, imido and silyl groups; d is 0 or 1; and the chemical symbol of

----- in formula (2) represents a carbon-carbon single or double bond.

4. The flat plate according to claim 1, wherein the repeating units (A-i) having no norbornane structure are represented by the formula (3):

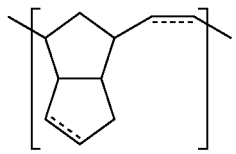

(3)

wherein the chemical symbol of

----- in formula (3) represents a carbon-carbon single or double bond.

5. The flat plate according to claim 1, wherein the repeating units (A-ii) having a norbornane structure are represented by the formula (5):

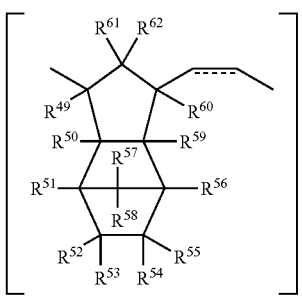

(5)

wherein $R^{49}$ through $R^{62}$ are the same as $R^{35}$ through $R^{48}$ as defined in formula (4), respectively; and the chemical symbol of

----- in formula (5) represents a carbon-carbon single or double bond.

6. The flat plate according to claim 1, wherein the repeating units (A-ii) having a norbornane structure are represented by the formula (6):

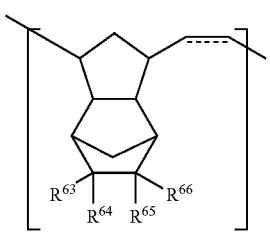

(6)

wherein $R^{63}$ through $R^{66}$ are the same as $R^{38}$ through $R^{41}$ as defined in formula (4), respectively; and the chemical symbol of

----- in formula (6) represents a carbon-carbon single or double bond.

7. The flat plate according to claim 1, wherein the cycloolefin polymer has a temperature of at least 280° C. at which the loss of polymer on heating reaches 5% by weight.

8. The flat plate according to claim 1, wherein the cycloolefin polymer has a melt viscosity of $1\times10^2$ to $1\times10^5$ poise as measured at a temperature of 260° C.

9. The flat plate according to claim 1, wherein the cycloolefin polymer contains not larger than 20% by weight, based on the cycloolefin polymer, of a fraction having a molecular weight of not larger than 1,000.

10. The flat plate according to claim 1, wherein the cycloolefin polymer contains 0.2% to 20% by weight, based on the cycloolefin polymer, of a fraction having a molecular weight of not larger than 1,000.

11. The flat plate according to claim 1, wherein the repeating units (A) having an alicyclic structure comprises, based on the repeating units (A), at least 50% by weight of repeating units (A-i) having no norbornane structure and more than 0% but not more than 50% by weight of repeating units (A-ii) having a norbornane structure.

12. The flat plate according to claim 1, wherein the repeating units (A) having an alicyclic structure comprises, based on the repeating units (A), at least 70% by weight of repeating units (A-i) having no norbornane structure and more than 0% but not more than 30% by weight of repeating units (A-ii) having a norbornane structure.

13. A light guide plate composed of the flat plate as claimed in claim 1.

14. A light guide plate according to claim 13, which has a wedge-shaped cross-section.

15. A light guide plate according to claim 13, which has a light reflection plane with a printed pattern.

16. A light guide plate according to claim 13, which has a light reflection plane with a plurality of V-shaped grooves.

17. A light guide plate according to claim 13, which has a wedge-shaped cross-section and a light reflection plane with a plurality of V-shaped grooves which have pitches gradually decreasing from the light-incident side end toward the tip end of the wedge-shaped cross-section.

18. A light guide plate according to claim 13, which has an illuminating surface with a surface area of 10 to 2,500 cm$^2$ and has a thickness of 0.5 to 10 mm.

19. A light guide plate according to claim 13, wherein the phase difference of the light guide plate as measured in the direction of thickness is not larger than 100 nm.

* * * * *